(12) United States Patent
Oguri et al.

(10) Patent No.: US 9,416,293 B2
(45) Date of Patent: Aug. 16, 2016

(54) RECORDING MEDIUM

(71) Applicant: CANON KABUSHIKI KAISHA, Tokyo (JP)

(72) Inventors: Isamu Oguri, Yokohama (JP); Hisao Kamo, Ushiku (JP); Masahito Miyabe, Yokohama (JP); Olivia Herlambang, Kawasaki (JP); Naoya Hatta, Kawasaki (JP); Shinya Yumoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/591,722

(22) Filed: Jan. 7, 2015

(65) Prior Publication Data

US 2015/0197658 A1 Jul. 16, 2015

(30) Foreign Application Priority Data

Jan. 10, 2014 (JP) ................................ 2014-003142

(51) Int. Cl.
 *C08K 5/24* (2006.01)
 *C09D 129/04* (2006.01)
 *C08K 5/5419* (2006.01)

(52) U.S. Cl.
 CPC ............ *C09D 129/04* (2013.01); *C08K 5/5419* (2013.01)

(58) Field of Classification Search
 CPC ............................ C09D 129/04; C08K 5/5419
 USPC ........................................................ 524/265
 See application file for complete search history.

(56) References Cited

U.S. PATENT DOCUMENTS 4,591,652 A * 5/1986 DePasquale ............ C07F 7/182
 556/419

FOREIGN PATENT DOCUMENTS

| JP | S61-10483 A | 1/1986 |
|----|----|----|
| JP | H07-232473 A | 9/1995 |
| JP | H08-132731 A | 5/1996 |
| JP | H09-66664 A | 3/1997 |
| JP | H09-76628 A | 3/1997 |
| JP | 2006-231786 A | 9/2006 |
| JP | 2006-232586 A | 9/2006 |
| JP | 2006231786 A * | 9/2006 |
| JP | 2007-245713 A | 9/2007 |

OTHER PUBLICATIONS

Translation of JP 2006-231786, Sep. 7, 2006.*

* cited by examiner

*Primary Examiner* — Hui Chin
(74) *Attorney, Agent, or Firm* — Canon U.S.A., Inc. IP Division

(57) ABSTRACT

A recording medium that includes a base material and an ink-receiving layer. The ink-receiving layer includes an inorganic particle including a structure represented by General Formula (1) and a binder.

11 Claims, No Drawings

RECORDING MEDIUM

BACKGROUND OF THE INVENTION

1. Field of the Invention

The present invention relates to a recording medium.

2. Description of the Related Art

A recording medium that includes an ink-receiving layer that contains inorganic particles has been used because it has good ink absorbency and allows an image having high color developability to be formed. Generally, the recording medium that includes an ink-receiving layer that contains inorganic particles is prepared by applying an ink-receiving layer coating liquid that contains the inorganic particles to a base material and subsequently drying the resulting coating film. However, there have been technical problems with the above-described method where the viscosity of the ink-receiving layer coating liquid may be disadvantageously increased while the coating liquid is prepared, or cracking may occur in the ink-receiving layer while the ink-receiving layer is drying.

In order to address the above-described technical problems that may occur during application of the ink-receiving layer coating liquid, hitherto, there have been proposed methods (e.g., Japanese Patent Laid-Open Nos. 2006-232586 and 2007-245713, hereinafter referred to as "PTL 1" and "PTL 2", respectively) in which a specific material is used for preparing the ink-receiving layer coating liquid or the pH of the ink-receiving layer coating liquid is controlled to a specific value. In PTL 1, it is described that controlling the pH of a coating liquid that includes fumed silica reduces the viscosity of the coating liquid, which reduces occurrence of cracking in the ink-receiving layer. In PTL 2, it is described that use of a coating liquid that includes inorganic particles, a silane coupling agent, and at least one substance selected from the group consisting of a basic inorganic salt and ammonia and that has a pH of 5.0 or less reduces occurrence of cracking in the ink-receiving layer. In PTL 2, it is also described that the silane coupling agent is adsorbed onto the surfaces of the inorganic particles.

However, a recording medium that includes an ink-receiving layer that contains inorganic particles modified with a silane coupling agent as in PTL 2 is known in the related art. In Japanese Patent Laid-Open No. 2006-231786 (hereinafter, referred to as "PTL 3"), a recording medium that includes an ink-receiving layer that contains inorganic particles that are surface-modified with a silane coupling agent having a reactive substituent and inorganic particles that are surface-modified with another silane coupling agent having a functional group that reacts with the reactive substituent is described. In PTL 3, it is described that this recording medium has good ink absorbency and high surface strength and allows an image having high color developability to be formed. The silane coupling agents described in PTLs 2 and 3 do not include hydroxyl groups.

SUMMARY OF THE INVENTION

According to one aspect of the present invention, there is provided a recording medium including:
a base material; and
an ink-receiving layer including
an inorganic particle including a structure represented by General Formula (1), and
a binder.

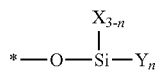

The structure represented by General Formula (1) is bonded to the surface of the inorganic particle at the position marked with *. In General Formula (1), X represents any of an alkoxy group having 1 to 8 carbon atoms, an aryloxy group, an acetoxy group, a halogen atom, a hydrogen atom, a hydrocarbon group having 1 to 8 carbon atoms, and —O—*; Y represents a structure including two or more hydroxyl groups, and at least one of the hydroxyl groups is a primary hydroxyl group; and n is 1, 2, or 3.

Further features of the present invention will become apparent from the following description of exemplary embodiments.

DESCRIPTION OF THE EMBODIMENTS

According to the study conducted by the inventors of the present invention, in the recording media prepared by the methods described in PTLs 1 and 2, the viscosity of the coating liquid was reduced by a certain degree, but occurrence of cracking in the ink-receiving layer was not reduced to a level desired in the present invention. In the recording medium described in PTL 3, the viscosity of the coating liquid was high and cracking occurred in the ink-receiving layer. In all of the above recording media, cracking occurred in the ink-receiving layer especially in the case where, subsequent to application of the coating liquid, the resulting coating film was rapidly dried with hot air of 90° C. or more.

Accordingly, the present invention is directed to providing a recording medium that allows occurrence of cracking in the ink-receiving layer to be reduced.

Hereinafter, a preferred embodiment of the present invention is described in detail below.

According to the study conducted by the inventors of the present invention, it is considered that cracking in an ink-receiving layer is caused due to weak interaction between inorganic particles and a binder. Thus, in order to increase the interaction between inorganic particles and a binder, the inventors devised the use of inorganic particles having a structure including a plurality of hydroxyl groups that strongly interact with a binder. In particular, inorganic particles interact with a binder with effect when the inorganic particles includes a structure represented by General Formula (1) shown below, which includes two or more hydroxyl groups and at least one of the hydroxyl groups is a primary hydroxyl group. However, it is considered that, even when the surfaces of inorganic particles are modified with a silane coupling agent that does not include hydroxyl groups as in PTLs 2 and 3, interaction between such inorganic particles and the binder is weak and occurrence of cracking in the ink-receiving layer is not reduced to a sufficient degree.

Recording Medium

The recording medium according to an embodiment of the present invention includes a base material and an ink-receiving layer. The recording medium according to the embodiment may be used as an ink-jet recording medium in an ink-jet recording method. Components of the recording medium according to the embodiment are described below.

Base Material

The base material may be composed of only base paper. Alternatively, the base material may include base paper and a resin layer, that is, a base paper coated with a resin. In this embodiment, a base material that includes base paper and a resin layer is preferably used. In such a case, the resin layer may be formed on only one surface of the base paper or on both surfaces of the base paper.

Base Paper

The base paper is mainly made of wood pulp. As needed, synthetic pulp such as polypropylene and synthetic fibers such as polyester may be used as materials for making the base paper. Examples of the wood pulp include bleached hardwood kraft pulp (LBKP), bleached hardwood sulfite pulp (LBSP), bleached softwood kraft pulp (NBKP), bleached softwood sulfite pulp (NBSP), hardwood dissolving pulp (LDP), softwood dissolving pulp (NDP), unbleached hardwood kraft pulp (LUKP), and unbleached softwood kraft pulp (NUKP). These wood pulps may be used alone or in combination of two or more. Among these wood pulps, LBKP, NBSP, LBSP, NDP, and LDP that include a relatively large amount of short-fiber component are preferably used. As pulp, a chemical pulp (sulfate pulp or sulfite pulp) that does not contain a large amount of impurities may be used. A pulp that has been bleached in order to enhance brightness may also be used. As needed, a sizing agent, a white pigment, a paper-strength additive, a fluorescent brightening agent, a water-retaining agent, a dispersant, and a softening agent may be added to the base paper.

In this embodiment, the thickness of the base paper is preferably 50 µm or more and 130 µm or less and is more preferably 90 µm or more and 120 µm or less. In this embodiment, the thickness of the base paper is determined in the following manner. The recording medium is cut with a microtome to expose its cross section, and the cross section is observed using a scanning electron microscope. The thickness of the base paper is measured at 100 or more randomly chosen positions, and the average of the measured values is considered to be the thickness of the base paper. In this embodiment, the thicknesses of the other layers are measured also in the above-described manner.

In this embodiment, the paper density of the base paper defined by JIS P 8118 is preferably 0.6 g/cm$^3$ or more and 1.2 g/cm$^3$ or less and is more preferably 0.7 g/cm$^3$ or more and 1.2 g/cm$^3$ or less.

Resin Layer

In this embodiment, in the case where the base paper is covered with a resin, it is desirable only that the resin layer be arranged so as to cover a portion of the surface of the base paper. However, the coverage of the resin layer (i.e., the ratio of the area of a portion of the surface of the base paper covered with the resin layer to the area of the entire surface of the base paper) is preferably 70% or more, is more preferably 90% or more, and is further preferably 100%, that is, the entire surface of the base paper is covered with the resin layer.

In this embodiment, the thickness of the resin layer is preferably 20 µm or more and 60 µm or less and is more preferably 35 µm or more and 50 µm or less. In the case where the resin layer is formed on both surfaces of the base paper, it is preferable that the thickness of the resin layer formed on each surface of the base paper falls within the above-described range.

The resin constituting the resin layer may be a thermoplastic resin. Examples of the thermoplastic resin include an acrylic resin, an acrylic silicone resin, a polyolefin resin, and a styrene-butadiene copolymer. Among these thermoplastic resins, a polyolefin resin is preferably used. The term "polyolefin resin" used herein refers to a polymer produced using an olefin as a monomer. Specific examples of such a polyolefin resin include a homopolymer and a copolymer of ethylene, propylene, isobutylene, or the like. The above-described polyolefin resins may be used alone or in combination of two or more as needed. Among these polyolefin resins, polyethylene is preferably used. A low-density polyethylene (LDPE) and a high-density polyethylene (HDPE) may be used as polyethylene.

In this embodiment, the resin layer may include, for example, a white pigment, a fluorescent brightening agent, and ultramarine blue in order to control opacity, brightness, and hue. In particular, it is preferable that the resin layer includes a white pigment in order to enhance opacity. Examples of the white pigment include rutile-type titanium oxide and anatase-type titanium oxide. In this embodiment, the content of the white pigment in the resin layer is preferably 3 g/m$^2$ or more and 30 g/m$^2$ or less. In the case where the resin layer is formed on both surfaces of the base paper, it is preferable that the total content of the white pigment in the two resin layers falls within the above-described range. In the resin layer, the content of the white pigment is preferably 25% by mass or less of the content of the resin constituting the resin layer. If this proportion exceeds 25% by mass, the dispersion stability of the white pigment may be degraded.

Ink-Receiving Layer

In this embodiment, the ink-receiving layer includes inorganic particles having a structure represented by General Formula (1) and a binder. In this embodiment, the ink-receiving layer may be composed of a single layer or a plurality of sublayers. The ink-receiving layer may be formed on only one surface of the base material or may be formed on both surfaces of the base material. The thickness of the ink-receiving layer is preferably 15 µm or more and 60 µm or less and is more preferably 30 µm or more and 45 µm or less. Materials that may be included in the ink-receiving layer are described below.

Inorganic Particles Having a Structure Represented by General Formula (1)

In this embodiment, the ink-receiving layer includes inorganic particles having a structure represented by General Formula (1) below.

The structure represented by General Formula (1) is bonded to the surfaces of the inorganic particles at the position marked with *. In General Formula (1), X represents any of an alkoxy group having 1 to 8 carbon atoms, an aryloxy group, an acetoxy group, a halogen atom, a hydrogen atom, a hydrocarbon group having 1 to 8 carbon atoms, and —O—*. The expression "X represents —O—*" means that a silicon atom (Si) is bonded to the surface of an inorganic particle via an oxygen atom (O). The inorganic particle to which the structure represented by General Formula (1) is bonded through —O—* may be different from or same as an inorganic particle to which the structure represented by General Formula (1) is bonded at the position marked with * of the General Formula (1). However, it is considered that, generally, the inorganic particle to which the structure represented by General Formula (1) is bonded through —O—* is same as an inorganic particle to which the structure represented by General Formula (1) is bonded at the position marked with * of the General Formula (1) because the inorganic particle is considerably larger than the structure represented by General Formula (1) above. In General Formula (1), Y represents a structure including two or more hydroxyl groups, and at least one of the hydroxyl groups is a primary hydroxyl group; and n is 1, 2, or 3 and preferably 1.

In this embodiment, the structure represented by General Formula (1) may be a structure represented by General Formula (2) below. In other words, the ink-receiving layer may include inorganic particles having the structure represented by General Formula (2) below.

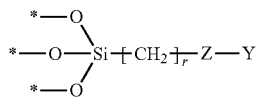
(2)

The structure represented by General Formula (2) is bonded to the surface of an inorganic particle at the positions marked with *. In General Formula (2), Z represents any of a single bond, an amide group, an ether group, a carbonyl group, and an ester group. In particular, it is preferable that Z represents any of a single bond, an amide group, and an ether group. The expression "Z represents a single bond" means that the structure represented by Y is directly bonded to the methylene group (—CH$_2$—). In General Formula (2), Y represents a structure including two or more hydroxyl groups, and at least one of the hydroxyl groups is a primary hydroxyl group; and r is an integer of 0 to 5.

In this embodiment, the structure represented by Y in General Formula (1) or (2) may include a structure represented by General Formula (3) below.

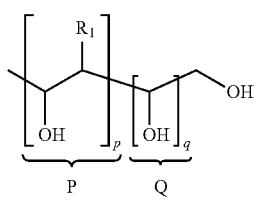
(3)

In General Formula (3), $R_1$ represents a hydrogen atom or a hydrocarbon group having 1 to 8 carbon atoms, and p+q is an integer of 1 or more. The order of the structures P and Q may be random. In other words, General Formula (3) covers not only a case where the structures P and Q are arranged in a manner of -P-P-P-P-Q-Q-, but also cases where the structures P and Q are arranged, for example, in a manner of -Q-Q-Q-P-P-P-, in an alternate manner of -P-Q-P-Q-P-Q-, and in a random manner of -P-P-Q-P-Q-Q-.

In this embodiment, the inorganic particles having the structure represented by General Formula (1) may be produced by, for example, modifying the surfaces of inorganic particles with a compound represented by General Formula (4) below.

(4)

In General Formula (4), X represents any of an alkoxy group having 1 to 8 carbon atoms, an aryloxy group, and an acetoxy group; Y represents a structure including two or more hydroxyl groups, and at least one of the two or more hydroxyl groups is a primary hydroxyl group; and n is 1, 2, or 3.

Inorganic particles have hydroxyl groups on the surfaces thereof, and the compound represented by General Formula (4) is reacted with the hydroxyl groups of the surfaces of the inorganic particles. Thus, inorganic particles having the structure represented by General Formula (1) are produced.

In this embodiment, the compound represented by General Formula (4) may be at least one compound selected from Compounds 1 to 3 below. In the following formulae, R represents a hydrogen atom or a hydrocarbon group having 1 to 8 carbon atoms.

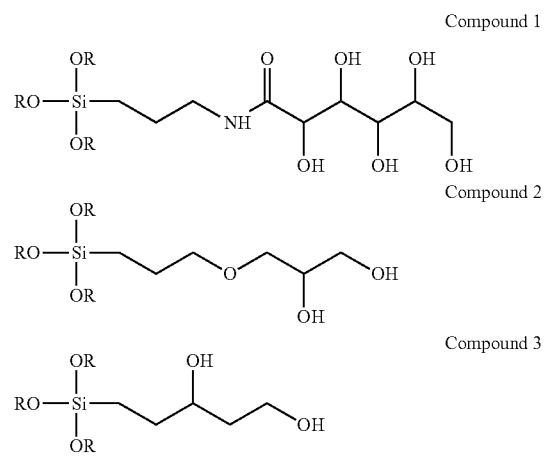

In this embodiment, in the inorganic particles having the structure represented by General Formula (1), the content of the structure represented by General Formula (1) is preferably 1% by mass or more and 15% by mass or less and is more preferably 2% by mass or more and 10% by mass or less of the content of the inorganic particles. In order to achieve the above proportion, the amount of compound represented by General Formula (4) used for modifying the surfaces of the inorganic particles is preferably 1% by mass or more and 15% by mass or less and is more preferably 2% by mass or more and 10% by mass or less of the content of the inorganic particles.

In this embodiment, the content (mass %) of the inorganic particles having the structure represented by General Formula (1) in the ink-receiving layer is preferably 50% by mass or more and 98% by mass or less and is more preferably 70% by mass or more and 96% by mass or less.

In this embodiment, the amount (g/m$^2$) of inorganic particles having the structure represented by General Formula (1) used for forming the ink-receiving layer is preferably 8 g/m$^2$ or more and 45 g/m$^2$ or less. In such a case, an ink-receiving layer having a desirable thickness is likely to be formed.

Examples of the inorganic particles used in this embodiment include particles of fumed silica, alumina hydrate, fumed alumina, colloidal silica, titanium dioxide, zeolite, kaoline, talc, hydrotalcite, zinc oxide, zinc hydroxide, aluminum silicate, calcium silicate, magnesium silicate, zirconium oxide, and zirconium hydroxide. These inorganic particles may be used alone or in combination of two or more as needed. Among the above-described inorganic particles, particles of fumed silica, alumina hydrate, fumed alumina are preferably used, and fumed silica particles are further preferably used. That is, fumed silica particles having the structure represented by General Formula (1) are further preferably used.

Examples of the fumed silica include AEROSIL series (produced by Evonik Industries) and REOLOSIL QS-type (produced by Tokuyama Corporation).

In this embodiment, the specific surface area of the fumed silica is preferably 50 m$^2$/g or more and 400 m$^2$/g or less and is more preferably 200 m$^2$/g or more and 350 m$^2$/g or less as measured by a BET method.

In this embodiment, an alumina hydrate represented by General Formula (X) below may be suitably used.

$$Al_2O_{3-n}(OH)_{2n} \cdot mH_2O \qquad \text{General Formula (X)}$$

(where n is 0, 1, 2, or 3; m is 0 or more and 10 or less and is preferably 0 or more and 5 or less; and m and n do not become 0 simultaneously)

The value of m is not always an integer because $mH_2O$ represents an aqueous phase that can be desorbed and is not involved in the formation of a crystal lattice in many cases. The value of m may become zero when alumina hydrate is heated.

In this embodiment, any publicly known method may be employed for producing the alumina hydrate. Specific examples of the publicly known methods include a method in which an aluminum alkoxide is hydrolyzed, a method in which sodium aluminate is hydrolyzed, and a method in which an aqueous sodium aluminate solution is neutralized by adding an aqueous solution of aluminum sulfate or aluminum chloride thereto.

Known crystal structures of alumina hydrate are an amorphous structure, a gibbsite structure, and a boehmite structure, which varies depending on the heat-treatment temperature. The crystal structure of alumina hydrate can be analyzed by X-ray diffractometry. In this embodiment, among the above-described crystal structures, an alumina hydrate having a boehmite structure and an amorphous alumina hydrate are preferably used. Specific examples of such alumina hydrates include alumina hydrates described in, for example, Japanese Patent Laid-Open Nos. 7-232473, 8-132731, 9-66664, 9-76628 and, as commercially available products, Disperal HP14 and HP18 (produced by Sasol Limited). The above-described alumina hydrates may be used alone or in combination of two or more.

In this embodiment, the specific surface area of the alumina hydrate is preferably 100 $m^2/g$ or more and 200 $m^2/g$ or less and is more preferably 125 $m^2/g$ or more and 175 $m^2/g$ or less as measured by a BET method. A BET method is a method in which molecules or ions having known sizes are adsorbed onto the surface of a sample and the specific surface area of the sample is calculated from the amount of the molecules or ions adsorbed. In this embodiment, nitrogen gas is used as a gas that is to be adsorbed onto a sample.

Examples of the fumed alumina include γ-alumina, α-alumina, δ-alumina, θ-alumina, and χ-alumina. Among these fumed aluminas, γ-alumina is preferably used in order to form an image having high optical density and achieve good ink absorbency of the recording medium. Specific examples of the fumed alumina include AEROXIDE; Alu C, Alu 130, Alu 65 (produced by Evonik Industries).

In this embodiment, the specific surface area of the fumed alumina is preferably 50 $m^2/g$ or more and 150 $m^2/g$ or less and is more preferably 80 $m^2/g$ or more and 120 $m^2/g$ or less as measured by a BET method.

Cationic Compound

In this embodiment, the ink-receiving layer may include a cationic compound. The amount of the cationic compound is preferably 1 part by mass or more and 10 parts by mass or less relative to 100 parts by mass of the inorganic particles.

Examples of the cationic compound include a cationic polymer and the salt of a polyvalent metal. In particular, a cationic polymer is preferably used from the viewpoint of the stability of the coating liquid.

Examples of the cationic polymer include polymers having a cationic group that is a primary to tertiary amino group or a quaternary ammonium group. Examples of such polymers include polydiallyldimethylammonium chloride, polydiallylamine hydrochloride, and polymethyldiallylamine hydrochloride. Among these polymers, in particular, polydiallyldimethylammonium chloride is preferably used. The molecular weight of the cationic polymer is preferably 2,000 or more and 50,000 or less.

Binder

In this embodiment, the ink-receiving layer includes a binder. In this embodiment, the term "binder" refers to a material with which the inorganic particles are bound to one another to form a coating film.

In this embodiment, in the ink-receiving layer, the content of the binder is preferably 50% by mass or less and is more preferably 30% by mass or less of the content of the inorganic particles from the viewpoint of the ink absorbency of the recording medium. From the viewpoint of the binding property of the binder in the ink-receiving layer, this proportion is preferably 5.0% by mass or more and is more preferably 8.0% by mass or more.

Examples of the binder include starch derivatives such as oxidized starch, etherified starch, and phosphorylated starch; cellulose derivatives such as carboxymethyl cellulose and hydroxyethyl cellulose; casein, gelatin, soybean protein, polyvinyl alcohol, and derivatives thereof; conjugated-polymer latexes such as polyvinylpyrrolidone, a maleic anhydride resin, a styrene-butadiene copolymer, and a methyl methacrylate-butadiene copolymer; acrylic-polymer latexes such as an acrylate polymer and a methacrylate polymer; vinyl-polymer latexes such as an ethylene-vinyl acetate copolymer; functional-group-modified polymer latexes produced by modifying the above-described polymers with a monomer containing a functional group such as a carboxyl group; polymers produced by cationizing the above-described polymers with a cationic group; polymers produced by cationizing the surfaces of the above-described polymers with a cationic surfactant; polymers produced by polymerizing monomers constituting the above-described polymers in the presence of cationic polyvinyl alcohol and thereby distributing polyvinyl alcohol over the surfaces of the resulting polymers; polymers produced by polymerizing monomers constituting the above-described polymers in a liquid dispersion in which cationic colloidal particles are suspended and thereby distributing the cationic colloidal particles over the surfaces of the resulting polymers; aqueous binders including a thermosetting synthetic resin such as a melamine resin or a urea resin; polymers and copolymers of an acrylate or a methacrylate, such as polymethyl methacrylate; and synthetic resins such as a polyurethane resin, an unsaturated polyester resin, a vinyl chloride-vinyl acetate copolymer, polyvinyl butyral, and an alkyd resin. These binders may be used alone or in combination of two or more as needed.

Among the above-described binders, polyvinyl alcohol and a polyvinyl alcohol derivative are preferably used. Examples of the polyvinyl alcohol derivative include cation-modified polyvinyl alcohol, anion-modified polyvinyl alcohol, silanol-modified polyvinyl alcohol, and polyvinyl acetal. A polyvinyl alcohol having a primary to tertiary amino group or a quaternary ammonium group in its main chain or side chain as described in Japanese Patent Laid-Open No. 61-10483 is preferably used as cation-modified polyvinyl alcohol.

The polyvinyl alcohol may be synthesized by, for example, saponifying polyvinyl acetate. The saponification degree of the polyvinyl alcohol is preferably 80 mol % or more and 100 mol % or less and is more preferably 85 mol % or more and 98 mol % or less. The term "saponification degree" used herein refers to the proportion of the number of moles of hydroxyl groups generated by a saponification reaction when polyvinyl acetate is saponified to produce polyvinyl alcohol. In this embodiment, the saponification degree is measured by a method conforming to JIS-K6726. The average polymerization degree of the polyvinyl alcohol is preferably 2,000 or more and is more preferably 2,000 or more and 5,000 or less. In this embodiment, average polymerization degree is viscosity-average polymerization degree measured by a method conforming to JIS-K6726.

In preparation of the ink-receiving layer coating liquid, polyvinyl alcohol or a polyvinyl alcohol derivative may be used in the form of an aqueous solution. In such a case, the solid content of the polyvinyl alcohol or the polyvinyl alcohol derivative in the aqueous solution is preferably 3% by mass or more and 20% by mass or less.

Crosslinking Agent

In this embodiment, the ink-receiving layer may further include a crosslinking agent. Examples of the crosslinking agent include aldehyde compounds, melamine compounds, isocyanate compounds, zirconium compounds, amide compounds, aluminum compounds, boric acids, and borates. These crosslinking agents may be used alone or in combination of two or more as needed. In particular, in the case where polyvinyl alcohol or a polyvinyl alcohol derivative is used as a binder, among the above-described crosslinking agents, boric acids and borates are preferably used.

Examples of the boric acids include orthoboric acid ($H_3BO_3$), metaboric acid, and diboric acid. The borates may be water-soluble salts of the above-described boric acids. Examples of such borates include alkali-metal salts of boric acids, such as a sodium salt and a potassium salt of boric acid; alkaline-earth metal salts of boric acid, such as a magnesium salt and a calcium salt of boric acid; and an ammonium salt of boric acid. Among the above-described boric acids, orthoboric acid is preferably used from the viewpoints of the temporal stability of the coating liquid and the effect of reducing cracking.

The amount of the crosslinking agent used may be controlled depending on the manufacture conditions and the like. In this embodiment, in the ink-receiving layer, the content of the crosslinking agent is preferably 1.0% by mass or more and 50% by mass or less and is more preferably 5% by mass or more and 40% by mass or less of the content of the binder.

In the case where the binder is polyvinyl alcohol and the crosslinking agent includes at least one compound selected from boric acids and borates, in the ink-receiving layer, the total content of the boric acids and the borates is preferably 5% by mass or more and 30% by mass or less of the content of the polyvinyl alcohol.

Other Additives

In this embodiment, the ink-receiving layer may include additives other than those described above. Specific examples of the other additives include a pH adjuster, a thickener, a fluidity modifier, an antifoaming agent, a foam inhibitor, a surfactant, a mold-release agent, a penetrant, a coloring pigment, a coloring dye, a fluorescent brightening agent, an ultraviolet absorber, an antioxidant, a preservative, an antifungal agent, a water-resistant additive, a dye fixative, a curing agent, and a weathering material.

Undercoat Layer

In this embodiment, an undercoat layer may be interposed between the base material and the ink-receiving layer in order to increase the adhesion between the base material and the ink-receiving layer. The undercoat layer may include a water-soluble polyester resin, gelatin, polyvinyl alcohol, and the like. The thickness of the undercoat layer is preferably 0.01 µm or more and 5 µm or less.

Backcoat Layer

In this embodiment, in order to enhance ease of handling, suitability for conveyance, and resistance to conveyance abrasion that occurs while printing is continuously performed with a number of recording media being stacked on top of one another, a backcoat layer may be formed on a surface of the base material on the side opposite to the side on which the ink-receiving layer is formed. The backcoat layer may include a white pigment, a binder, and the like. The thickness of the backcoat layer is preferably set so that the dry coating amount is 1 $g/m^2$ or more and 25 $g/m^2$ or less.

Method for Producing Recording Medium

In this embodiment, a method for producing the recording medium may be, but not particularly limited to, a method that includes preparing an ink-receiving layer coating liquid and applying the ink-receiving layer coating liquid to a base material. The method for producing the recording medium is described below.

Method for Preparing Base Material

In this embodiment, any common papermaking method may be employed for preparing a base paper. Examples of a papermaking apparatus include a Foundrinier paper machine, a cylinder paper machine, a drum paper machine, and a twin-wire paper machine. In order to enhance the flatness and smoothness of the surface of the base paper, the base paper may be subjected to a surface treatment while heating under pressure during or subsequent to the papermaking step. Specific examples of the surface treatment method include calendar processes such as a machine calendar process and a supercalendar process.

Examples of a method for forming a resin layer on the base paper, that is, a method for covering the base paper with a resin, include melt-extraction method, wet lamination, and dry lamination. In particular, a melt-extraction method, in which one of or both surfaces of the base paper are extrusion-coated with a molten resin, is preferably employed. An example of the melt-extraction method which is widely employed is a method in which the base paper and a resin extruded from an extrusion die are brought into contact with each other at a nipping point between a nip roller and a cooling roller and subsequently pressure-bonded using the nip roller in order to laminate a resin layer on the base paper (also referred to as "extrusion-coating method"). Prior to the formation of the resin layer by a melt-extraction method, the base paper may be subjected to a pretreatment in order to further increase the adhesion between the base paper and the resin layer. Examples of the pretreatment include an acid-etching treatment using a sulfuric acid-chromic acid mixture, a flame treatment using gas flame, an ultraviolet irradiation treatment, a corona discharge treatment, a glow discharge treatment, and an anchor coat treatment with an alkyl titanate or the like. Among these treatments, a corona discharge treatment is preferably performed. In the case where the resin layer includes a white pigment, the base paper may be covered with a mixture of a resin and the white pigment.

Method for Forming Ink-Receiving Layer

In the recording medium according to the embodiment, an ink-receiving layer may be formed on the base material by, for example, the following method. An ink-receiving layer coating liquid is prepared. Subsequently, the coating liquid is applied to the base material, and the resulting coating film is dried. Thus, the recording medium according to the embodiment is formed. The coating liquid may be applied to the base material using a curtain coater, an extrusion coater, or a slide hopper coater. When the coating liquid is applied to the base material, the coating liquid may be heated. The coating film may be dried after the application of the coating liquid by, for example, using a hot-air drying machine such as a linear tunnel dryer, an arch dryer, an air-loop dryer, or a sine-curve air-float dryer or a drying machine in which infrared radiation, a heat dryer, microwave, or the like is used. In this embodiment, occurrence of cracking in the ink-receiving layer may be advantageously reduced even when the coating film is rapidly dried using hot air of 90° C. or more.

EXAMPLES

The above-described embodiment of the present invention is described further in detail with reference to the examples and comparative examples. The embodiment is not limited to the following examples without departing from the scope of the present invention. The "part" in Examples and Comparative Examples are on a mass basis unless otherwise noted.

Example 1

Preparation of Recording Medium

Preparation of Base Material

Paper stock was prepared by mixing 80 parts of LBKP having a Canadian Standard freeness of 450 mLCSF, 20 parts of NBKP having a Canadian Standard freeness of 480 mLCSF, 0.60 parts of cationic starch, 10 parts of heavy calcium carbonate, 15 parts of precipitated calcium carbonate, 0.10 parts of an alkylketene dimer, and 0.030 parts of cationic polyacrylamide and subsequently adding water to the resulting mixture so that the solid content in the mixture was 3.0% by mass. The paper stock was made into paper using a Foundrinier paper machine. The resulting paper was wet-pressed three times and dried using a multi-cylinder dryer. Then, the paper was impregnated with an aqueous oxidized starch solution using a size-press apparatus so that the solid content in the paper became 1.0 $g/m^2$ after the paper was dried. The paper was dried and subjected to machine-calendar finishing. Thus, a base paper having a basis weight of 170 $g/m^2$, a Stockigt sizing degree of 100 seconds, an air permeability of 50 seconds, a Beck smoothness of 30 seconds, a Gurley stiffness of 11.0 mN, and a thickness of 100 μm was prepared. Subsequently, a resin composition including 70 parts of low-density polyethylene, 20 parts of high-density polyethylene, and 10 parts of titanium oxide was applied onto one surface of the base paper at a dry-coating amount of 25 $g/m^2$. Herein, this surface is considered to be the front surface of the base material. Subsequently, low-density polyethylene was applied onto the other surface of the base paper. Thus, a base material was prepared.

Preparation of Ink-Receiving Layer Coating Liquid

Preparation of Inorganic Particle Dispersion Liquid 1

To 78.5 parts of ion-exchange water, 1.11 parts (3 parts by mass relative to 100 parts by mass of fumed silica on a solid content basis) of polydiallyldimethylamine hydrochloride (SHALLOL DC902P, produced by DKS Co. Ltd., solid content: 50 mass %) that served as a cationic polymer and 1.85 parts (5 parts by mass relative to 100 parts by mass of fumed silica) of an aqueous solution (solid content: 50%) of a silane coupling agent H-1 (Compound 1 with R being an ethyl group) were added. While the resulting aqueous solution was stirred using a T.K. HOMO MIXER MARKII Model 2.5 (produced by PRIMIX Corporation) at 3,000 rpm, 18.5 parts of fumed silica (AEROSIL300, produced by Evonik Industries) was gradually added to the aqueous solution. The aqueous solution was further treated using CLEARMIX (produced by M Technique Co., Ltd.) at 10,000 rpm for 30 minutes and then maintained at 40° C. for 3 days. Thus, an inorganic particle dispersion liquid 1 having a solid content of 20% by mass was prepared.

Preparation of Binder Solution

Polyvinyl alcohol (PVA235, produced by KURARAY Co., Ltd., viscosity-average polymerization degree: 3,500, saponification degree: 88 mol %) was dissolved in ion-exchange water to prepare a binder solution having a solid content of 8.0% by mass.

Preparation of Ink-Receiving Layer Coating Liquid

The inorganic particle dispersion liquid 1 and the binder solution were mixed together in such a manner that the solid content of polyvinyl alcohol was 23.0 parts relative to 100.0 parts of the solid content of the fumed silica included in the inorganic particle dispersion liquid 1 to prepare a mixed solution. A crosslinking agent (aqueous solution of orthoboric acid, solid content: 5% by mass) was added to the mixed solution in such a manner that the amount of the crosslinking agent was 4 parts relative to 100 parts of fumed silica included in the mixed solution on a solid content basis. An appropriate amount of ion-exchange water was further added to the mixture to prepare an ink-receiving layer coating liquid having a total solid content of 12%.

Preparation of Recording Medium

The ink-receiving layer coating liquid was applied to the base material prepared above at a dry coating amount of 22 $g/m^2$. After the application of the coating liquid, the resulting coating film was dried using hot air of 90° C. to prepare a recording medium.

Examples 2 and 3

In Examples 2 and 3, a recording medium was prepared as in Example 1, except that the silane coupling agent used in Example 1 was changed to a silane coupling agent H-2 (Compound 2 with R being a hydrogen atom) and a silane coupling agent H-3 (Compound 3 with R being a methyl group), respectively.

Examples 4 to 10

A recording medium was prepared as in Example 1, except that the proportions of the silane coupling agent H-1, the cationic polymer, and the binder were changed as shown in Table 1.

Comparative Example 1

A recording medium was prepared as in Example 1, except that the silane coupling agent H-1 was not used.

Comparative Examples 2 and 3

In Comparative example 2 and 3, a recording medium was prepared as in Example 1, except that the silane coupling agent H-1 used in Example 1 was changed to a silane coupling agents H-4 and H-5, respectively, which are represented by the following formulae.

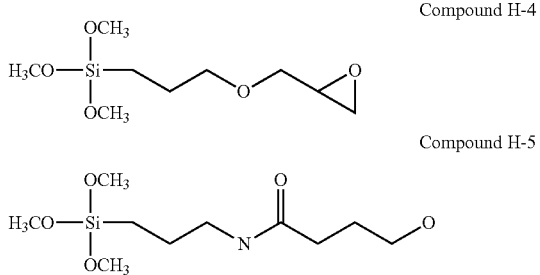

Comparative Example 4

Preparation of an inorganic particle dispersion liquid was attempted as in Example 1, except that the silane coupling agent used in Example 1 was changed to aminopropyltriethoxysilane and 2.76 parts of 1-M aqueous hydrogen chloride solution was used. However, gelation of the inorganic particle dispersion liquid occurred.

Evaluations

Evaluation of Cracking in Ink-Receiving Layer

The recording media prepared above were each visually inspected in order to evaluate cracking in the ink-receiving layer in accordance with the following criteria. Table 1 summarizes the evaluation results.

A: Cracks were absent in the ink-receiving layer, or a few cracks were present, but at a negligible level.

B: Cracks were present in the ink-receiving layer.

Viscosity of Ink-Receiving Layer Coating Liquid

The viscosity (45° C.) of each of the ink-receiving layer coating liquids prepared above was measured using a Brookfield viscometer. Evaluation was conducted on the basis of the viscosity of the ink-receiving layer coating liquid in accordance with the following criteria. Table 1 summarizes the evaluation results.

A: The viscosity of the ink-receiving layer coating liquid was 200 mPa·s or less.

B: The viscosity of the ink-receiving layer coating liquid was more than 200 mPa·s and 300 mPa·s or less.

C: The viscosity of the ink-receiving layer coating liquid was more than 300 mPa·s and 400 mPa·s or less.

D: The viscosity of the ink-receiving layer coating liquid was more than 400 mPa·s and 500 mPa·s or less.

E: The viscosity of the ink-receiving layer coating liquid was more than 500 mPa·s, or it was impossible to measure the viscosity of the ink-receiving layer coating liquid because gelation of the coating liquid occurred.

Evaluation of Color Developability of Recorded Image

A 2.5-cm-square black solid image (i.e., image with a recording duty of 100%) was recorded on each of the recording media prepared above using an ink-jet recording apparatus (PIXUS MP990, produced by CANON KABUSHIKI KAISHA) including an ink cartridge (BCI-321, produced by CANON KABUSHIKI KAISHA) in "Glossy Pro, Platinum Grade, No Color Correction" mode at 23° C. and a relative humidity of 50%. The optical density of the recorded image was measured using a reflection densitometer (530 spectrodensitometer, produced by X-Rite, Incorporated). The color developability of the recorded image was evaluated on the basis of the optical density of the recorded image in accordance with the following criteria. The higher the optical density of a recorded image, the higher the color developability of the recorded image. Table 1 summarizes the evaluation results.

A: The optical density of the recorded image was 2.35 or more.

B: The optical density of the recorded image was 2.25 or more and less than 2.35.

C: The optical density of the recorded image was 2.15 or more and less than 2.25.

D: The optical density of the recorded image was 2.05 or more and less than 2.15.

E: The optical density of the recorded image was less than 2.05.

TABLE 1

Conditions for preparing coating liquids and evaluation results

| | Silane coupling agent | | Cationic polymer | Binder | Boric acid | Evaluation results | | |
|---|---|---|---|---|---|---|---|---|
| | | | | | | Cracking in ink-receiving | Viscosity of coating | Color developability |
| Example No. | Type | (Parts) | (Parts) | (Parts) | (Parts) | layer | liquid | of image |
| Example 1 | H-1 | 5 | 3 | 23 | 4 | A | A | A |
| Example 2 | H-2 | 5 | 3 | 23 | 4 | A | A | A |
| Example 3 | H-3 | 5 | 3 | 23 | 4 | A | A | A |
| Example 4 | H-1 | 3 | 3 | 23 | 4 | A | B | A |
| Example 5 | H-1 | 10 | 3 | 23 | 4 | A | A | B |
| Example 6 | H-1 | 5 | 3 | 18 | 4 | A | A | A |
| Example 7 | H-1 | 5 | 3 | 26 | 4 | A | A | B |
| Example 8 | H-1 | 5 | 3 | 30 | 4 | A | B | C |
| Example 9 | H-1 | 5 | 5 | 23 | 4 | A | A | A |
| Example 10 | H-1 | 5 | 2 | 23 | 4 | A | B | C |
| Comparative example 1 | — | 0 | 3 | 23 | 4 | B | E | B |
| Comparative example 2 | H4 | 5 | 3 | 23 | 4 | B | E | B |
| Comparative example 3 | H-5 | 5 | 3 | 23 | 4 | B | D | B |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-003142, filed Jan. 10, 2014, which is hereby incorporated by reference herein in its entirety.

What is claimed is:

1. A recording medium comprising:
a base material; and
an ink-receiving layer comprising
an inorganic particle including a structure represented by General Formula (1), and
a binder being a polyvinyl alcohol or a polyvinyl alcohol derivative,

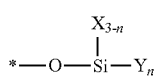  (1)

wherein the structure represented by General Formula (1) is bonded to a surface of the inorganic particle at a position marked with *, and
wherein, in General Formula (1),
X represents any one of an alkoxy group having 1 to 8 carbon atoms, an aryloxy group, an acetoxy group, a halogen atom, a hydrogen atom, a hydrocarbon group having 1 to 8 carbon atoms, and —O—*,
Y represents a structure including two or more hydroxyl groups, at least one of the two or more hydroxyl groups being a primary hydroxyl group, and
n is 1, 2, or 3.

2. The recording medium according to claim 1,
wherein the structure represented by General Formula (1) is a structure represented by General Formula (2),

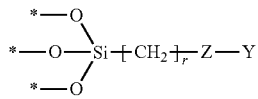  (2)

wherein the structure represented by General Formula (2) is bonded to the surface of the inorganic particle at positions marked with *, and
wherein, in General Formula (2),
Z represents any one of a single bond, an amide group, an ether group, a carbonyl group, and an ester group,
Y represents a structure including two or more hydroxyl groups, at least one of the two or more hydroxyl groups being a primary hydroxyl group, and
r is an integer of 0 to 5.

3. The recording medium according to claim 1,
wherein the structure represented by Y in General Formula (1) or (2) includes a structure represented by General Formula (3),

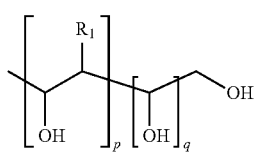  (3)

and wherein, in General Formula (3), $R_1$ represents any one of a hydrogen atom and a hydrocarbon group having 1 to 8 carbon atoms, and p+q is an integer of 1 or more.

4. The recording medium according to claim 1,
wherein, in the inorganic particle including the structure represented by General Formula (1), the content of the structure represented by General Formula (1) is 1% by mass or more and 15% by mass or less of the content of the inorganic particle.

5. The recording medium according to claim 1,
wherein the surface of the inorganic particle is modified with a compound represented by General Formula (4),

  (4)

and wherein, in General Formula (4),
X represents any one of an alkoxy group having 1 to 8 carbon atoms, an aryloxy group, and an acetoxy group,
Y represents a structure including two or more hydroxyl groups, at least one of the two or more hydroxyl groups being a primary hydroxyl group, and
n is 1, 2, or 3.

6. The recording medium according to claim 5,
wherein the compound represented by General Formula (4) is at least one compound selected from Compounds 1 to 3,

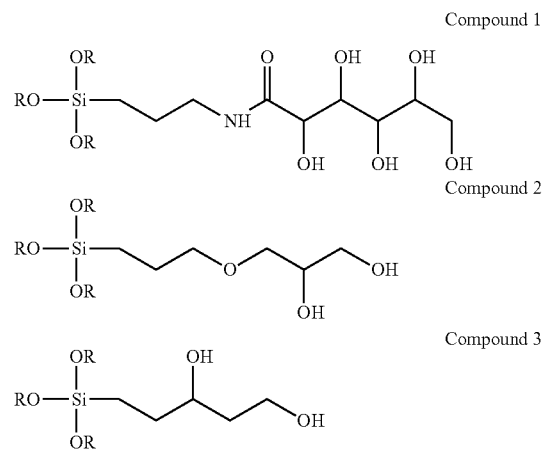

and wherein, in the above formulae, R represents any one of a hydrogen atom and a hydrocarbon group having 1 to 8 carbon atoms.

7. The recording medium according to claim 1,
wherein the inorganic particle comprises a fumed silica particle.

8. The recording medium according to claim 1,
wherein the binder comprises polyvinyl alcohol.

9. The recording medium according to claim 1,
wherein the ink-receiving layer comprises a cationic polymer.

10. The recording medium according to claim 1,
wherein the inorganic particle comprises a fumed silica, an alumina hydrate, or a fumed alumina.

11. The recording medium according to claim 1,
wherein the polyvinyl alcohol derivative comprises a cation-modified polyvinyl alcohol, an anion-modified polyvinyl alcohol, a silanol-modified polyvinyl alcohol, or a polyvinyl acetal.

* * * * *